Feb. 7, 1939.  P. L. SCOTT  2,146,032
INTERNAL COMBUSTION ENGINE
Filed Aug. 29, 1934  3 Sheets-Sheet 1

INVENTOR.
Philip L. Scott
BY
Parker + Carter
ATTORNEYS.

Feb. 7, 1939. P. L. SCOTT 2,146,032
INTERNAL COMBUSTION ENGINE
Filed Aug. 29, 1934   3 Sheets-Sheet 2

INVENTOR.
Philip L. Scott
BY Parker + Carter
ATTORNEYS.

Feb. 7, 1939.   P. L. SCOTT   2,146,032
INTERNAL COMBUSTION ENGINE
Filed Aug. 29, 1934   3 Sheets-Sheet 3
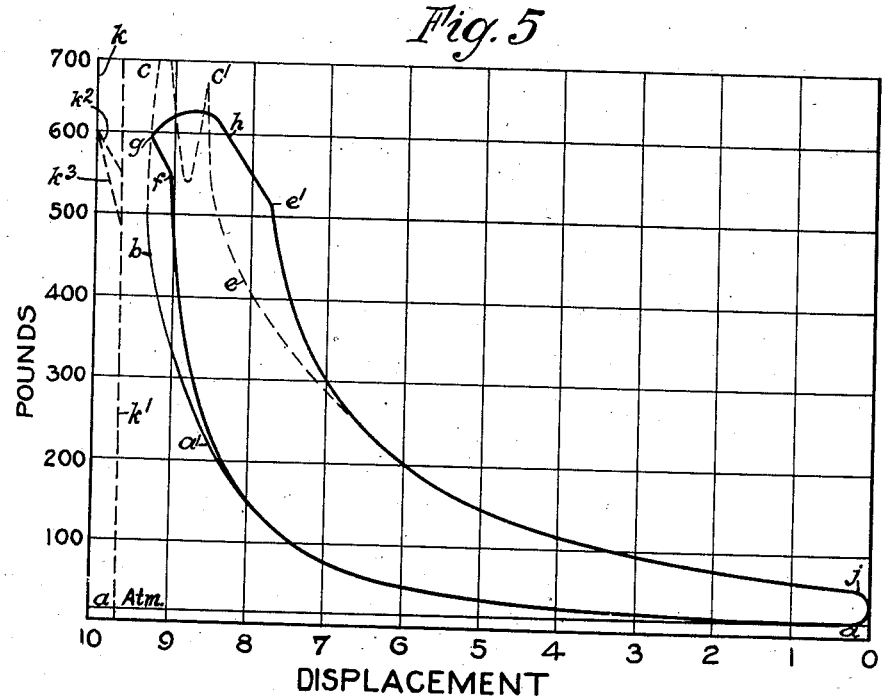
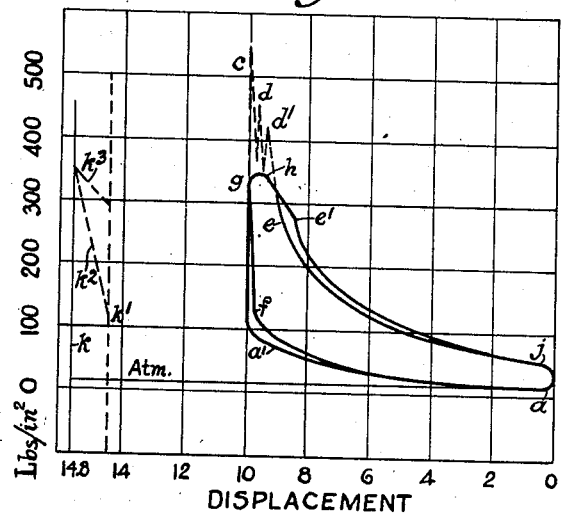
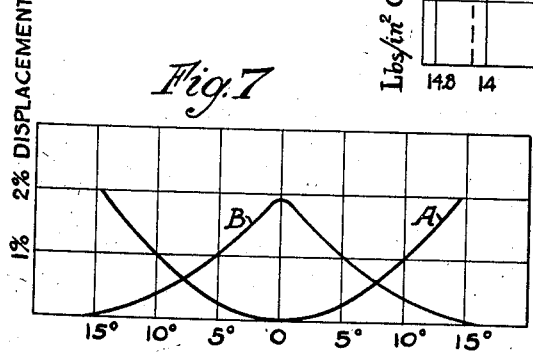
INVENTOR.
Philip L. Scott
BY Parker + Carter
ATTORNEYS.

Patented Feb. 7, 1939

2,146,032

UNITED STATES PATENT OFFICE 2,146,032

INTERNAL COMBUSTION ENGINE

Philip Lane Scott, Chicago, Ill.

Application August 29, 1934, Serial No. 741,920

4 Claims. (Cl. 123—1)

My invention relates to improvements in the dynamic and thermodynamic corelations in internal combustion engines employing free pistons.

One object of my invention is to provide fully responsive means for controlling major pressure irregularities during combustion in an internal combustion engine.

Another object of my invention is to control and direct air currents in the combustion chamber during combustion.

Another object of my invention is to alter the pressure-volume relations during the combustion period in response to variations in combustion activity but in a manner which includes two compression movements and two expansion movements in alternation.

Other objects will appear from time to time in the specification and claims.

The invention is illustrated more or less diagrammatically in the following drawings:

Fig. 5 shows the pressure-volume relations (indicator card) during one cycle of a Diesel engine experiencing rough combustion and the pressure-volume relation tendencies resulting from the application of this invention, constituting a novel thermodynamic cycle.

Fig. 6 shows the pressure-volume relations in an Otto cycle engine under similar sets of conditions.

Fig. 7 is a graph showing piston movement plotted against degrees of crank motion constituting a volume or working piston displacement diagram during the general combustion period and a second volume curve showing the increase and decrease in volume produced by the control device at the same time. The showing is only for one phase relation, namely, working piston minimum coinciding with control maximum but there may be other relative positions.

Like parts will be designated by like characters throughout.

Figure 1:
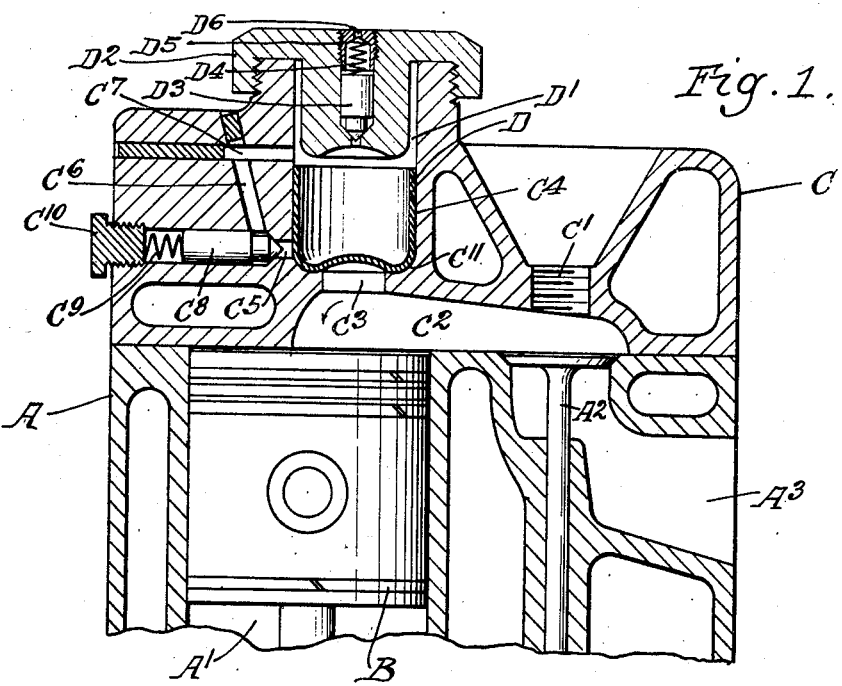
Fig. 1 shows a cross section through a central plane of an internal combustion engine embodying one form of the control device.

In Fig. 1 A is a cylinder block with a cylinder $A^1$ and a piston B mounted to reciprocate therein. Gas admission and discharge is accomplished through suitable valves and ports one of which is shown at $A^2$ and $A^3$. A cylinder head C closes the cylinder and has an aperture for an ignition device or fuel injection device at $C^1$. The combustion chamber is formed generally by the walls of the cavity $C^2$, which has an opening $C^3$ leading to an auxiliary chamber $C^4$. In this auxiliary chamber a light piston D is mounted without mechanical connection to other engine parts but free to position itself responsive to various forces, including the pressure in $C^2$ and in a receiver $D^1$ located behind it. This receiver is closed by a plug $D^2$ having a pressure valve $D^3$ held seated by the spring $D^4$ and the retainer $D^5$. The receiver is in communication with the combustion space through the passages $C^5$, $C^6$, $C^7$ having the pressure control valve $C^8$ held seated by the spring $C^9$ and the retainer $C^{10}$. This passage system is not exposed to the pressure from the combustion space until the piston D rises from its seat $C^{11}$ at the bottom of the cylinder $C^4$. The communication between the passageways and the receiver $D^1$ is furthermore cut off when the piston D passes the port or passage $C^7$. There is a passage or vent $D^6$ permitting the control valve $D^3$ to vent to the outside air.

Figure 2:
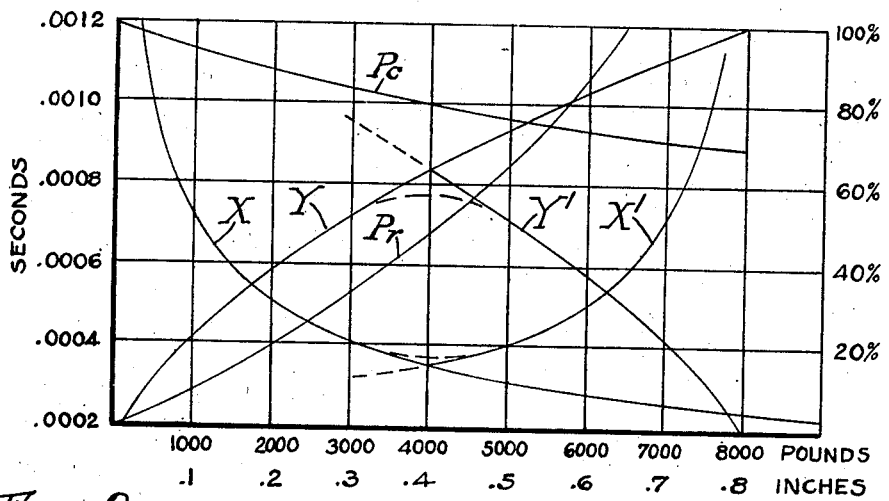
Fig. 2 shows the force and pressure relations involved in the operation of the control device.

In Fig. 2 the force, velocity, acceleration and pressure relations are set forth which control the movement of the piston D of Fig. 1 or similar structures. Curves X and X' are both force and acceleration curves. They may be read directly on the scales shown on the drawings as force curves—the force required to move a given mass (1/10th pound) a given distance (one inch) in a given time per scale. The lower scale gives the force in pounds required to move 1/10th pound one inch in the time read in seconds on the left hand scale. Since, in this case, force is directly proportional to weight and also to distance, these curves will serve for any weight and any distance. For example, if it be desired to know the steady force which must be applied to move a piston weighing 1½ pounds a distance of two inches in .0008 second: the force to move one-tenth pound one inch is found to be about 800 pounds and by direct proportion the force sought is found to be 24,000 pounds (subject of course to approximation in the reading of the curve).

These curves are generic for acceleration since the factor of time squared is common to both and scale values may readily be applied; i. e., a calculated acceleration curve would have the same curvature as the one drawn and it is therefore merely a matter of setting down the values on the scales to make them direct reading. The curve X shows the decreasing value of acceleration as velocity increases and the curve X' the increasing value of acceleration (negative) as velocity decreases, thus representing the acceleration condition of a body started from rest, moved and brought to rest.

The curves Y and Y' are both distance and velocity curves. They may be read directly for distance on the scales shown for the weight and force selected, namely, .0344 pound weight and 100 pounds force, the distance scale being the lower one and the time scale the left hand one. They are applicable for other weights and forces by proportion. For example, if it is desired to know how far a piston weighing 1½ pounds will move under a steady force of 350 pounds in .0008 second, the distance a .0344 pound weight at 100 pounds force will move in .0008 second is found to be .37" and by direct proportion for force and inverse proportion for weight the distance for the case will be .00297 inch.

The curves Y and Y' are also generic for velocity since the factor of time appears as the first power in both relations and suitable scale values may be readily applied.

The two sets of curves taken together exhibit the familiar condition of maximum velocity at minimum acceleration. A clear and exact understanding of the relations of force, acceleration and velocity are, together with other factors subsequently described, essential in determining the relatively narrow limits within which the result desired in the performance of the control device described may be obtained.

It is to be understood that all these curves indicate primarily tendencies. The dotted lines are a rough suggestion of what might actually occur in operating conditions but the point of maximum velocity and minimum acceleration may occur at some other position than at half stroke as shown.

The curve $P_c$ shows the drop in combustion space pressure in per cent for an auxiliary chamber of 30 per cent the volume of the combustion chamber, said curve being plotted against the percentage ordinates designated at the right hand edge of the chart in respect to pressure abscissae designated at the lower edge of the chart. This curve is purely theoretical and indicates the drop in pressure in the combustion space which would occur with no combustion. Thus it is the measure of the expected reduction in total pressure with combustion.

The curve $P_r$ shows rise in receiver pressure under all operating conditions upon movement of the auxiliary piston within its chamber for a receiver of 2 to 1 ratio compared to the expected auxiliary piston displacement. The former, $P_c$, shows what may be expected in the way of dropping pressure in the combustion space and the latter the ability to obtain a desired pressure differential between the combustion space and the receiver to move the pistons D and F and also the ability to store energy for the return stroke of the pistons D and F. Similar curves of a different slope may be drawn for other percentages and ratios. An exact determination of these ratios is essential to the functioning of the control device which will operate only within certain limits of such relations. The initial pressure in the combustion chamber and in the receiver, the rate of pressure drop in the combustion space together with the pressure rise in the receiver and the energy capacity of the receiver volume of gas under the specific pressure conditions are vital factors and are exactly interrelated together with the force and distance curves already described. The distance curve can be evaluated, together with the free piston weight, to give the energy storing capacity of the free piston. All these factors are fundamentally related and present a complex group in which to establish operating conditions. Practical considerations such as the compound exponential relation of piston weights to diameter as found in practical construction disturb the purely theoretical deductions and prevent direct inference from basic equations. Plotted relations based on practical design even show reverse curvatures.

Naturally the speed of the engine is a vital factor as some values vary as the square of the speed with the consequence that a design suitable for low speed is entirely unusable at high speed. Such designs cannot be generally useful if limited only to low speed engines or effective only over part of the speed range of an engine. Failure to take into account and make provision for all these factors has resulted in failure of so-called "free piston" constructions heretofore, only a part of the problem being considered. This general problem revolves around the dynamic relationships rather than the mechanical structure for generally similar mechanical structures will perform totally unlike functions under different dynamic relations.

Figure 3:
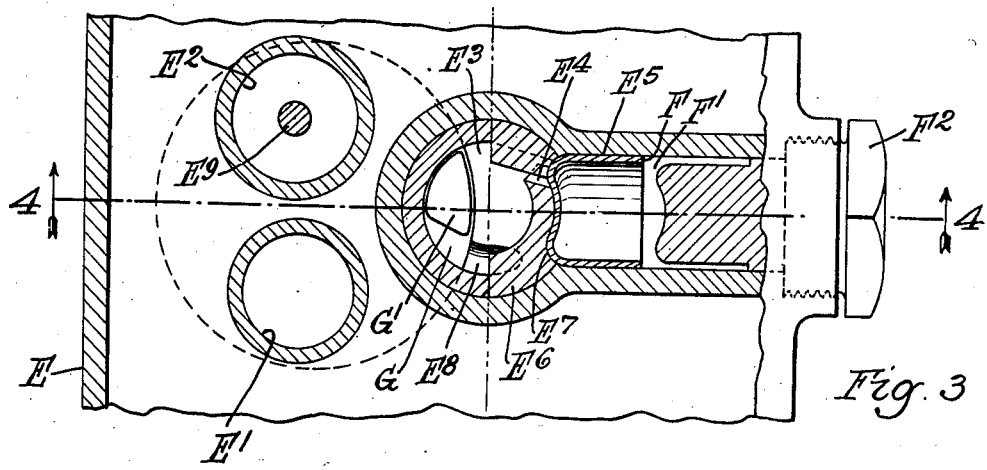
Fig. 3 shows a horizontal combined section of the control device applied to an engine of the Diesel type with a special embodiment of the method of air control, the section being taken at line 3—3 of Fig. 4.

Fig. 3 shows a double section through a Diesel type engine embodying the control device and showing a special form of air flow control.

The reference numeral E designates a cylinder head casting having as intake and outlet ports $E^1$ and $E^2$. A separate combustion chamber $E^3$ is included in the head structure. Connected to this chamber by a passage $E^4$ is a cylinder $E^5$. Within the cylinder there is mounted a piston F behind which a receiver $F^1$ is situated and closed by a plug $F^2$. The receiver $F^1$ is connected with the combustion chamber by means of the passageways $E^{10}$, $E^{11}$ and $E^{12}$ in which is placed the control valve $E^{13}$ seated by a spring $E^{14}$ and a retainer $E^{15}$. The piston F is arranged to seat upon an insert $E^6$ placed within the head E and forming in part the combustion chamber. The seating portion is shown at $E^7$.

Leading into the chamber $E^3$ is the gas control channel $E^8$ which co-operates with a piston formation $G^1$ to produce defined air flow.

Figure 4:
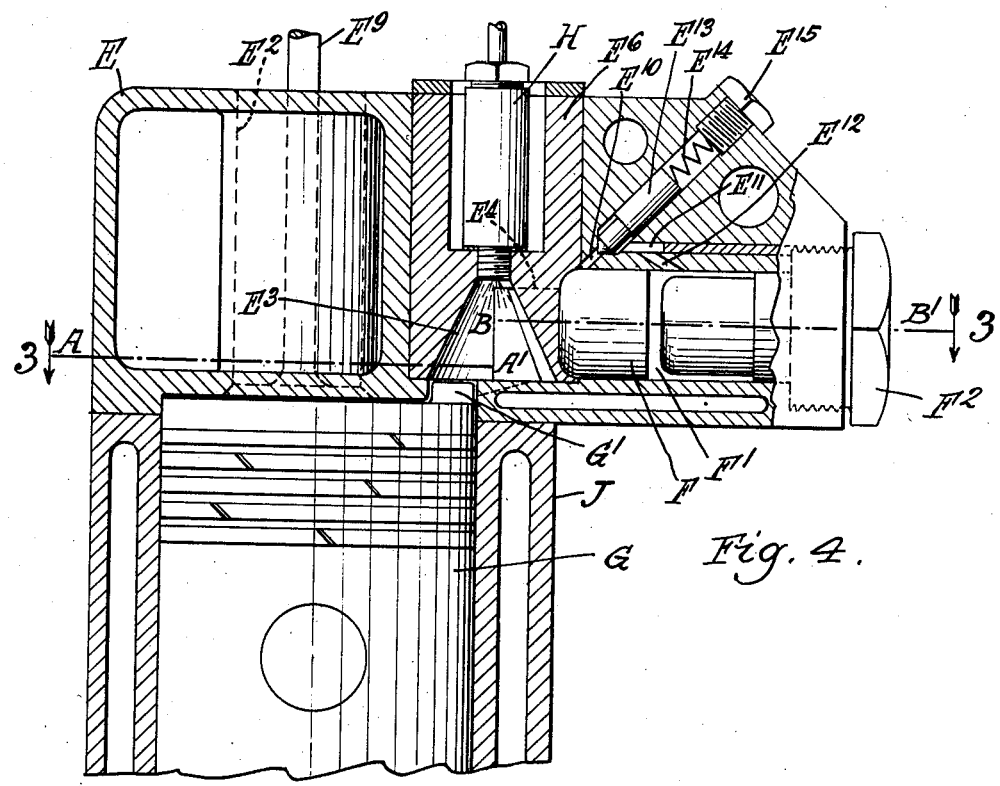
Fig. 4 shows a vertical section of the same engine, taken at line 4—4 of Fig. 3.

Fig. 4 shows a vertical section of the cylinder and head shown in Fig. 3.

The reference numeral E designates the cylinder head. $E^9$ is a valve member operating in a gas passage shown at $E^2$ in Fig. 3. $E^6$ is the insert forming the combustion chamber $E^3$. H is a fuel injection device arranged to supply fuel to the combustion chamber. J is a main cylinder casting in which a working piston G is arranged to reciprocate. The upper end of the piston G is provided with the formation $G^1$ shown in Fig. 3 and Fig. 4.

It is to be noted that the section A—A' of Fig. 3 is at a lower vertical level than the section B—B' of Fig. 4, for the purpose of showing the novel gas control passages.

Fig. 5 shows two indicator cards of a Diesel type internal combustion engine, one superimposed on the other, the dotted lines indicating a possible type for rough combustion and the solid lines showing the pressure volume relation tendencies which may be expected with the operation of the control device and process of this invention, and showing both the effect of pressure control on the combustion and also the highly important shifts in compression and expansion ratios, the latter being a direct measure of the thermal efficiency of the engine. The card shows how the expansion ratio in an engine of the present invention is increased, thereby increasing the efficiency as compared with an engine of same displacement and total clearance volume but without the control device.

The line $a$—$a$ is the atmospheric line. A four stroke cycle card will show negative pressures below this line and a two stroke cycle card will show slightly positive pressures above this line during the periods of exhaust and intake. These lines are omitted because the device will operate equally well on either two or four cycle and only compression, combustion and expansion curves are affected by the operation of the control device.

In the engine without my control device compression will occur along the line $a$—$b$ and for this example the compression pressure is assumed to be 450 pounds per inch square. This line is generally adiabatic in form. In practice fuel is often introduced before the end of compression period as for instance at the point $a'$, which may be about 25 degrees ahead of top centre position. The fuel does not burn at once and a material rise above normal compression pressure does not occur until the point $b$ is reached when active combustion starts. Thereafter the combustion may develop a high peak pressure at $c$, which in practice often goes above 1000 pounds per inch square and thereafter drops and rises again as shown at $c^1$ and thereafter expands from the point $e$ in a generally adiabatic manner to exhaust. There may be several fluctuations as shown at $c$ and $c^1$ but for efficient operation the generally adiabatic expansion must occur as early as possible after top centre piston position consistent with allowable maximum pressure. The thermal efficiency of an engine falls off rapidly as the generally adiabatic expansion is delayed. Practice has determined a point beyond which it is not profitable to attempt to operate an engine. This point at full load is about 13 per cent of the expansion stroke and for fractional loads proportionally less. Several factors may vary this figure.

By "generally adiabatic expansion" is meant a pressure volume relation on expansion which approaches the relation existing in expanding a perfect gas of same composition in which heat is neither added nor subtracted during the expansion. In practice heat may be added during expansion especially during the early stages. This is called "after burning" and is highly detrimental to thermal efficiency, and must be avoided. Also in practice heat is unavoidably transferred to the cylinder wall. These conditions cause some deviation from the true condition of adiabatic expansion and therefore the term "generally" adiabatic is used. It is clear therefore that a pressure control device to be fully effective must not only tend to reduce the rate of pressure rise but must also return the major portion of the charge, withdrawn from the combustion zone by the pressure reducing movement before a practically efficient, generally adiabatic expansion begins. Expressed in different terms this means that any control device must not prolong the period of burning substantially beyond that found to be practical. It is not sufficient merely to reduce the rate of pressure if burning is to be prolonged beyond such a period since the rapid loss in efficiency with after-burning, together with other losses, more than offset any gain from reduction in pressure rise. This is a vital point which has been entirely neglected heretofore in auxiliary free-piston structures.

Superimposed on the above card in Fig. 5 are solid lines indicating the pressure-volume tendencies under the control system of this invention. Line $a$—$f$ represents an approximate compression line for an engine embodying the control system of my invention. It will be noted that the pressure rises more rapidly than in the former case due to the smaller initially effective clearance space as represented by the clearance line $k'$. The clearance line for the engine without the control device is shown by the line $k$ and this line also becomes the clearance line after operation of the control device in the engine provided with same. Improvement in ignition lag is therefore obtained by the more rapid compression but the advantage of a lower compression pressure is achieved during the first part of the combustion period after the control device operates which it does at or about the beginning of the ignition period. This shift of conditions is shown by the line $f$—$g$ on the card and the line $k^2$ leading to the former clearance line $k$. The tendency toward pressure drop, although there is no actual pressure decrease, must be sufficient to keep the absolute pressure and temperature condition below the critical point at which an explosive wave forms so that burning will continue along some such line as $g$—$h$. At some point such as $h$ the effect of the restoring action of the control device is apparent during which period there is a tendency to raise the pressure above that which would be found in a comparable engine without the device. This continues to some point $e'$ which is the point of beginning of generally adiabatic expansion as described above. The point to be observed here is the advantage to be gained from completing the restoring action close to the point $e'$. From $e'$ to $j$ the generally adiabatic expansion takes place. The line $k^3$ represents the shift in the clearance relation which has the direct effect of increasing the actual expansion ratio of the cycle although combustion occurred at pressure-temperature conditions obtaining at a lower compression ratio. This is a highly important advantage. It is to be understood that these lines are diagrammatic, that, in practice they would blend one into the other and that the points $a'$, $f$, $g$, $h$ and $e'$ may shift around to some extent. The lines show tendencies rather than an actual card.

For convenience the cycle is spoken of as consisting of two expansion strokes and two compression strokes in alternation. This must be understood to be from a volumetric standpoint since the actual pressure conditions would not show this. Line $f$—$g$ is an expansion line viewed from a volumetric standpoint though it shows a pressure rise due to the addition of heat and line $h$—$e'$ shows a tendency to compression from a volumetric standpoint though the pressure drops. This line may be, in net effect of volume change, an expansion line if the restoring action of the control device occurs during a receding movement of the working piston which is faster than the restoring action in its volumetric effect but there is nevertheless the tendency toward compression as compared with an engine without the device and therefore this line is referred to as a compression line. Expressed in terms of card change the use of the control device tends to shift the latter part of the compression line and the early part of the expansion line to values below the generally adiabatic line as found in an engine without the device. These changes will proceed smoothly and in continuity. These diagrams have been plotted on the basis of same total clearance for both engines. This shows the greater thermal efficiency obtainable in an engine with the control device as compared to an engine without the device. Obviously an engine of the initial clearance volume equal to that of the engine with the control device but minus the device would operate at higher compression and much higher burning pressures. This shows that an engine having a compression ratio which would produce severe detonation without control may be operated without detonation by the use of the control device. The diagrams may of course be drawn to compare two engines having the same fixed clearances.

It is possible under several conditions that the effect of action of the control device may manifest itself once or more beyond the point $e'$ of the expansion line. This will not affect the expansion ratio if restoration occurs before point $j$ and will not affect the combustion provided a major part of the original restoration has already occurred before the point $e'$ thus returning air or fuel to the combustion zone before the generally adiabatic expansion.

Fig. 6 shows, superimposed on each other, two indicator cards of two engines operating on the Otto cycle, one with and one without the control system. The engine without control has a compression ratio of 4½ to 1. Its pressure-volume relations are shown by the lines $a$—$a'$, $c$, $d$, $c'$, $e$, $j$. The dotted portions suggest detonation which follows too rapid pressure rise. The relation in the engine with control, which has the same effective or net compression ratio due to the action of the control device, but a 5½ expansion ratio, is shown by the lines $a$, $f$, $g$, $h$, $e'$, $j$. The action in an Otto cycle engine is somewhat different from one in which the heat addition is at least partly at "constant pressure". In the Otto cycle engine heat addition is controlled solely by the rate of flame propagation whereas in the so-called Diesel engine the heat addition and consequent pressure rise is to some definite degree responsive to injection of fuel. It is possible therefore in the Diesel engine to relate the rate of injection, consequent heat addition and pressure rise and the action of the control device so that an approach may be made to a desirable condition of pressure rise due to heat just balancing pressure drop due to action of control whereby a true constant pressure line may be approached. In the Otto cycle engine the response of the pressure control can be related generally only to rate of flame movement and other combustion conditions in a pre-mixed charge. This is shown by the difference in the two sets of cards of Figures 5 and 6. The lines $k$, $k^1$, $k^2$, $k^3$ of Figure 6 show the shift of compression and expansion ratio. Since the expansion ratio controls the thermal efficiency and the compression ratio the nature of the combustion it is seen that the desirable effective condition is achieved of low compression ratio (effective) and high effective expansion ratio.

Figure 7 shows displacement curves of the main working piston and the free piston or control device, superimposed. A is the curve of the working piston against crank degrees during fifteen degrees each side of top center and B is an approximate curve of free piston displacement operating in exact phase with the main piston as to maximum effect at minimum motion of the main piston. It will be understood that the curve B may assume many forms depending on the force, energy and pressure relations, that it may not be symmetrical and that it may not be in phase with the main piston. Its action is related to the actual combustion conditions which are seldom in exact phase with the movement of the main piston. However it is generally desirable to have the major effect of the control device take place during the slow movement period of the main piston when it can have maximum effect on pressure conditions.

The use and operation of my invention are as follows:

The problem of combustion control in an internal combustion engine by changing pressure conditions by means of a free piston or its equivalent involves at least two major combustion phenomena and a complex dynamic set of conditions in the free piston system. Combustion proceeds in two widely different manners in an internal combustion engine; in the first, often referred to as "normal burning", the movement of flame largely by heat of conduction and by mass movement of the charge is characteristic. Movement of a flame through a combustible mixture is a relatively slow and orderly process, at least in its early stages, the measured velocities being from a few feet per second to somewhere about one hundred feet per second. Mass movement of the charge which carries flame with it is often called "turbulence" and may have velocities as high or higher than normal flame propagation. Pressure rise resulting from these conditions is, in general, orderly and related to the net spread of flame movement. This pressure rise has been measured in several ways subject to certain limitations and it has been found, measured on a basis of pounds per square inch per degree of crank motion, that a pressure rise of fifty pounds per degree is an approximate upper limit for engine speeds up to the present mid range of automotive practice. On another basis of measurement the pressure rise may be somewhere about five hundred thousand pounds per second for the so-called normal burn. These figures are not exact since the marginal region at the upper limit of normal burn is not definite. But they are valuable as marking approximately a region beyond which the second phase of combustion begins to occur. The second phase in some aspects is often called "detonation" or "rough combustion". It is characterized by an explosive wave which does not propagate largely by conduction or convection but has the characteristics of wave motion in which there is little actual translation but comparatively enormous velocity of propagation. The pressures in this wave are high and auto-ignition is an associated phenomenon. This type of combustion is highly undesirable in many conditions. Prior to the formation of an explosion wave the pressure conditions in the flame front of a normally burning charge are sensitive to the formation of the wave and slight changes have marked influence. Since the speed of the wave when formed may equal or exceed the velocity of sound in the medium in which it travels, it is obviously impossible to make a purely mechanical device within practical limits which can respond to such speed and any attempt to make a free piston responsive to the phenomenon called "detonation" is impossible in the light of present knowledge. But it is possible to make a mechanical structure which will be responsive to the conditions preceding detonation. And it has been shown that gas volumes acting perhaps in a cushioning manner can exert an influence on "detonation" itself, the gas inertia being greatly less than any practical mechanical structure. Therefore a free piston, used to control combustion irregularities must be effective before an explosion wave forms but its operation may be combined with a gas pocket which will absorb energy from a true explosion wave. The receding movement of the piston itself in its cylinder forms the gas pocket which must be designed in itself to act efficiently as a "detonation" cushion. And, as has been shown, such a free piston must return the part of the charge withdrawn in a major degree before an efficient generally adiabatic expansion commences in order that late burning of fuel may be avoided. The free piston should also perform a third function which may be highly important. It provides an opportunity to greatly accelerate mass movement of the charge during burning and at the time when the main piston is largely unable to cause any such movement. It is known that such air movement greatly reduces the tendency to formation of an explosion wave. Such air movement must be orderly and regular to be efficient. Eddy losses in irregular flow constitute a serious loss in many engines. It will be seen that the structure here proposed may accomplish all of these things or it may accomplish one or two of them according to the requirements.

The specific action of my control device begins some time after a charge of air or air and fuel is draw into the main engine cylinder and compression has progressed. During these early stages the free piston D of Fig. 1 and F of Fig. 3 rests in its innermost position with respect to the combustion space. Fuel may be introduced into the engine through a carburetor or through an injection device and ignition may be caused by any suitable means. At some time in the general region of ignition the pressure in the main cylinder rises high enough to overbalance the pressure behind the free piston in the closed receiver. Measured in pounds per square inch this pressure in the receiver may be substantially below the pressure in the main cylinder, the balance being achieved through the initial exposure of a smaller area of one face of the free piston to the higher pressure than the area exposed to the receiver pressure. Certain important advantages may be gained by using a high pressure differential in this manner. As soon as the piston moves its whole area is exposed to the main cylinder pressure and a large force at once set up to move the free piston which because of the extremely small time intervals must be accelerated with great rapidity. For this reason also the piston construction must be highly specialized since the inertia problem is a controlling factor. This is obviously of the greatest importance at the higher speeds. Previous proposed free piston structures have failed because, among other things, this matter was not taken into consideration. The more or less conventional structures used required forces greater than even the total maximum pressure of the engine could provide to move them as proposed. There are other equally important factors which have been omitted which this invention makes provision for. Upon a condition of unbalance occurring the free piston recedes with great rapidity. A high velocity is of itself desirable in order that the face of the piston may retreat at a speed greater than the forward movement of the flame. A second reason for the high velocity is the requirement of storage of kinetic energy in the piston which is one step in the energy transfers which finally return the piston to its inner position. As the piston recedes it obviously withdraws part of the charge from the main cylinder causing a tendency to pressure drop. The rate of this pressure drop must be adequate to prevent the formation of an explosion wave and must therefore be of the general order of magnitude of the rates of pressure change preceding the formation of such a wave, as for instance 35 pounds per degree. Instantaneous velocities of 50 or 60 feet per second are in the mid-range of flame speeds, in the region where pre-detonation conditions exist and it is desirable to have the free piston reach such instantaneous velocities if advantage is to be taken of the condition. In withdrawing a part of the charge the piston also will cause an air motion in the main combustion chamber. There may already have been a regular air flow in this chamber and it is desirable to have any further motion, which may be produced by the free piston, aid the initial motion. Finally the withdrawal of the free piston forms a gas chamber which may act as a gas cushion responsive to a true explosive wave. It is seen that this chamber is scavenged upon the return stroke of the free piston and therefore overcomes the major objection to such chamber as now used. The effect of the outward movement of the free piston is further to compress the gas in the receiver and this compression may be carried to a point considerably above the simultaneously existing pressure in the main cylinder due to the exchange of kinetic energy in the free piston to the gas in the receiver. The relation of initial pressure differential, weight of the free piston, velocity of the piston and energy storing capacity, the piston stroke and its pressure reducing capacity in the main cylinder and the energy storing capacity of the gas in the receiver together with the shape of the pressure rise curve in the receiver with respect to the pressure change curve of the main cylinder are all closely and delicately related. Slight changes in any one element may produce such changes in other functions as to produce an unworkable device. The relations are not what would be expected from consideration of the fundamental laws of dynamics because of changes introduced by the necessities of practical structure. It is found desirable to keep the receiver volume substantially less than the clearance space of the engine proper. A free piston sealing against the wall by reason of internal pressure aids in keeping the weight of this part down as conventional piston construction has objections.

The withdrawal of the free piston having been accomplished at a rate sufficient to prevent the formation of an explosion wave in the burning charge and its energy of motion having been given up to the air in the receiver this energy is at once available for returning the piston and expelling the part charge again. In an engine having injection of fuel and therefore some measure of control over combustion in this way it may be desirable to attempt to have this restoring action occur at a time and rate such that an approach may be had to a constant pressure condition in the main cylinder. This condition can be approached by proper relation of the factors described. As pointed out it is essential that the action of the free piston permit the full charge to be burned before an efficient expansion of the gas starts. On its return the free piston expels the gases ahead of it with vigor and provides an excellent means of causing a controlled and regular air flow in the main combustion zone or chamber. This air motion may be largely initiated by the expulsion stroke of the free piston but usually will be a continuation or co-operation with an air motion already existing in the main chamber.

It is seen that, as the piston recedes, it increases the effective clearance of the engine although a higher compression rate has been maintained up to the time of motion of the free piston. This early high compression rate is a definite aid to original ignition and the subsequent decrease in rate is beneficial to combustion. Upon expansion the reverse takes place the expansion ratio being increased and the thermal efficiency thereby increased by the return motion of the piston. After the piston has made a major delivery of the gases ahead of it in proper time for completion of combustion it may thereafter make one or more part strokes responsive to unbalanced pressures but these have no net effect on the thermal efficiency if the first stroke has been performed in time, which must be before the main piston has accomplished any substantial portion of its expansion stroke.

In the types of engines employing a combustion chamber separate and distinct from the clearance space in the working cylinder proper particular advantage may be taken of the ability of this control system to create or maintain controlled, regular air flow. One such construction is shown in Figs. 3 and 4. There are in fact three spaces concerned with the series of events, the space above the working piston, the separate combustion chamber and the auxiliary chamber formed by the free piston. Air or combustible charge is forced from the main cylinder into the separate combustion chamber through a gas nozzle shown at $E^8$ in Fig. 3. This particular nozzle is formed in part by the co-operation of an extension on the piston head which enters the throat connecting the main cylinder with the combustion chamber and so reduces the aperture as to form a nozzle of which the part $E^8$ forms an extension. This sets up a spiral whirl in the combustion chamber which dies down rapidly after the main piston passes through its point of rest at upper centre. But this directed air flow is again stimulated by the expulsion stroke of the free piston along the same path in which it was initiated. In this particular case the result is to create and maintain a rotating conical body of air into the central portions of which fuel is injected by the injector H. The rotation promotes mixture of the spray and fuel and the high velocity attained during the addition of fuel causes the heavier fuel particles to be progressively thrown out in to the outer blanket of air assuring them adequate air for combustion.

In engines lacking separate combustion chamber the action of the free piston often provides a means for obtaining a rapid and controlled air flow at a time when the main piston is unable to cause such action, which materially aids in combustion.

The desired pressure differential is established and maintained in the receiver back of the free piston by any suitable valve system, one form of which is shown in Fig. 1. The pressure difference is established in part by the tension on the valve spring $C^9$, and acting on the valve $C^8$, compels a ratio between the pressure in the cylinder and the pressure in the receiver to be maintained. If this pressure rises too high in the receiver due to occasional exceptionally high pressures developing in the main cylinder, then the valve $D^3$ is unseated and the pressure reduced to the intended amount. The return of this gas may be to the cylinder instead of the outside air. Normal leakage past the free piston will tend to drop pressures in the receiver and when these reach a minimum value the first mentioned valve will open and restore the proper value. A variety of other systems to accomplish this end may be employed.

It is to be further noted that this construction permits an automatic compensation in compression pressure in engines having throttle control, as maximum combustion pressures drop with closing of the throttle whereas the pressure holding the free piston seated is determined generally by the maximum pressure at full throttle from which it follows that the free piston will make shorter and shorter strokes and finally remain seated as the throttle is progressively closed. This prevents the increase of clearance volume which occurs when the free piston moves and increases the compression ratio at part throttle. This obviously is an important advantage.

I claim:

1. The method of handling the gases in an internal combustion engine which comprises compressing the gases, adding heat to the gases and simultaneously and suddenly, in response to said compression of the gases expanding the gases, adding further heat to the gases and during such heat addition, compressing them suddenly and expanding the gases at approximately the completion of said last mentioned compression, as successive steps.

2. The method of handling the gases in an internal combustion engine which includes a period of gas compression from one direction, a combined period of compression from one direction and sudden expansion from another direction in response to said compression, and the simultaneous addition of heat, a combined period of expansion in the former direction of compression and compression in the former direction of expansion and the simultaneous addition of heat, and a period of expansion commencing at approximately the completion of said last mentioned period, said last named expansion comprising a generally adiabatic expansion of a fully burned charge.

3. The method of burning fuel in an internal combustion engine which consists in first compressing a charge in a generally adiabatic manner to a point near the limit of piston motion, igniting said charge, suddenly withdrawing a portion of said charge in response to increase in pressure and returning substantially all of said charge before the beginning of a substantially adiabatic expansion of a fully burned mixture.

4. A method of acting upon the gases in an internal combustion engine which includes compression of the gases to a predetermined high value of pressure, suddenly and, in response to said compression, reducing said pressure and adding heat to the gases by combustion, whereby combustion occurs in part at a low value of pressure, suddenly restoring said high value of compression before expansion of said gases whereby expansion takes place at a high value of expansion ratio.

PHILIP LANE SCOTT.